US012792310B2

(12) United States Patent
Nam

(10) Patent No.: US 12,792,310 B2
(45) Date of Patent: Nov. 10, 2026

(54) APPARATUS WITH NEURAL NETWORK OPERATION METHOD

(71) Applicant: Samsung Electronics Co., Ltd., Suwon-si (KR)

(72) Inventor: Heewoo Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1102 days.

(21) Appl. No.: 17/183,523

(22) Filed: Feb. 24, 2021

(65) Prior Publication Data

US 2022/0076106 A1 Mar. 10, 2022

(30) Foreign Application Priority Data

Sep. 8, 2020 (KR) ........................ 10-2020-0114724

(51) Int. Cl.

*G06F 17/16* (2006.01)
*G06F 7/76* (2006.01)
*G06N 3/063* (2023.01)

(52) U.S. Cl.

CPC ................ *G06F 7/76* (2013.01); *G06F 17/16* (2013.01); *G06N 3/063* (2013.01)

(58) Field of Classification Search

CPC ................................... G06F 17/16; G06F 7/76
See application file for complete search history.

(56) References Cited

U.S. PATENT DOCUMENTS

| | | | | |
|---|---|---|---|---|
| 12,579,416 | B1 * | 3/2026 | Duong | G06N 3/048 |
| 12,619,868 | B2 * | 5/2026 | Collins | G06F 17/16 |
| 2019/0057063 | A1 * | 2/2019 | Liu | G06F 30/00 |
| 2019/0303762 | A1 * | 10/2019 | Sui | G06N 3/04 |
| 2019/0392297 | A1 * | 12/2019 | Lau | G06N 3/04 |
| 2020/0134417 | A1 * | 4/2020 | Mohapatra | G06N 3/04 |
| 2021/0019633 | A1 * | 1/2021 | Venkatesh | G06N 3/063 |
| 2021/0158132 | A1 * | 5/2021 | Huynh | G06N 3/045 |
| 2021/0201124 | A1 * | 7/2021 | Gelashvili | G06N 3/045 |
| 2021/0232902 | A1 * | 7/2021 | Gupta | G06N 3/045 |
| 2021/0241079 | A1 * | 8/2021 | Mills | G06N 20/10 |
| 2026/0154525 | A1 * | 6/2026 | Mohapatra | G06N 3/04 |

FOREIGN PATENT DOCUMENTS

| | | | |
|---|---|---|---|
| CN | 106970896 | A | 7/2017 |
| CN | 108765247 | A | 11/2018 |
| JP | 2020-27399 | A | 2/2020 |
| KR | 10-2018-0028442 | A | 3/2018 |

(Continued)

OTHER PUBLICATIONS

Patterson, David A., and John L. Hennessy. Computer Organization and Design: The Hardware/Software Interface (5th Edition). Morgan Kaufmann, 2013. (Year: 2013).*

(Continued)

*Primary Examiner* — James Trujillo
*Assistant Examiner* — Markus Anthony Villanueva
(74) *Attorney, Agent, or Firm* — NSIP Law

(57) ABSTRACT

A neural network operation method includes storing a matrix on which an operation of a neural network is to be performed, shuffling a portion of elements of the matrix, and performing a replacement operation for the operation based on the shuffled matrix.

16 Claims, 19 Drawing Sheets

(56) References Cited

FOREIGN PATENT DOCUMENTS

| | | | |
|---|---|---|---|
| KR | 10-2018-0125283 | A | 11/2018 |
| WO | WO 2020/046859 | A1 | 3/2020 |

OTHER PUBLICATIONS

Korean Office Action issued on Feb. 13, 2025 in corresponding Korean Patent Application No. 10-2020-0114724. (2 pages in English and 5 pages in Korean).
"Best Practices for TensorRT Performance" *Nvidia Best Practices*, Sep. 2018 (22 Pages in English).
Chinese Office Action issued on Jul. 16, 2025, in corresponding Chinese Patent Application No. 202110256248.4. (41 pages in English, 19pages in Chinese).

* cited by examiner

APPARATUS WITH NEURAL NETWORK OPERATION METHOD

CROSS-REFERENCE TO RELATED APPLICATIONS

This application claims the benefit under 35 USC § 119(a) of Korean Patent Application No. 10-2020-0114724 filed on Sep. 8, 2020, in the Korean Intellectual Property Office, the entire disclosure of which is incorporated herein by reference for all purposes.

BACKGROUND

1. Field

The following description relates to an apparatus with neural network operation method.

2. Description of Related Art

In the past, to perform an elementwise-sum operation, a multiply-accumulate (MAC) operator performed 1×1 convolution after successively arranging two feature maps in the form of a single feature map in a memory.

An elementwise operation does not typically require a separate weight. However, when the MAC operator is to perform an elementwise operation, a weight to be used for multiplication is required.

In addition, there are restrictions that the MAC operator should have a configurable data path and that a portion of MAC operators should be controllable to an enable or disable state for channel-wise MAC operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network operation method includes storing a matrix on which an operation of a neural network is to be performed, shuffling a portion of elements of the matrix, and performing a replacement operation for the operation based on the shuffled matrix.

The shuffling may include shuffling either one or both of rows and columns of a first matrix included in the matrix and either one or both of rows and columns of a second matrix included in the matrix.

The shuffling may further include storing one row or column of the rows or columns of the first matrix, storing another row or column of the rows or columns of the first matrix at a location a predetermined interval away from a location at which the one row or column is stored, and storing one row or column of the rows or columns of the second matrix between the location at which the one row or column is stored and the location at which the other row or column is stored.

The predetermined interval may be determined based on a number of matrices on which the operation is to be performed.

The shuffling may include transmitting one row or column of the rows or columns of the first matrix to an operator for the replacement operation, and transmitting one row or column of the rows or columns of the second matrix to the operator, so as to be operated adjacent to the one row or column.

The operation may include either one or both of an elementwise-sum operation and an elementwise-max operation.

The replacement operation may include any one or any combination of any two or more of a max-pool operation, an average pool operation, a sum pool operation, and a convolution operation.

The performing may include merging the replacement operation with another operation when the other operation is to be performed after the operation.

The merging may include determining whether the replacement operation and the other operation are mergeable, and merging the replacement operation with the other operation based on a determination result.

The merging of the replacement operation with the other operation based on the determination result may include merging the replacement operation with the other operation by adjusting a kernel size of the other operation and a stride size of the other operation based on the number of rows or columns of the matrix.

A non-transitory computer-readable storage medium may store instructions that, when executed by one or more processors, configure the one or more processors to perform the method above.

In another general aspect, a neural network operation apparatus includes a memory configured to store a matrix on which an operation of a neural network is to be performed, and a processor configured to shuffle a portion of elements of the matrix, and perform a replacement operation for the operation based on the shuffled matrix.

The processor may be further configured to shuffle either one or both of rows and columns of a first matrix included in the matrix and either one or both of rows and columns of a second matrix included in the matrix.

The processor may be further configured to store one row or column of the rows or columns of the first matrix, store another row or column of the rows or columns of the first matrix at a location a predetermined interval away from a location at which the one row or column is stored, and store one row or column of the rows or columns of the second matrix between the location at which the one row or column is stored and the location at which the other row or column is stored.

The predetermined interval may be determined based on the number of matrices on which the operation is to be performed.

The processor may be further configured to transmit one row or column of the rows or columns of the first matrix to an operator for the replacement operation, and transmit one row or column of the rows or columns of the second matrix to the operator, so as to be operated adjacent to the one row or column.

The operation may include either one or both of an elementwise-sum operation and an elementwise-max operation.

The replacement operation may include any one or any combination of any two or more of a max-pool operation, an average pool operation, a sum pool operation, and a convolution operation.

The processor may be further configured to merge the replacement operation with another operation when the other operation is to be performed after the operation.

The processor may be further configured to determine whether the replacement operation and the other operation are mergeable, and merge the replacement operation with the other operation based on a determination result.

The processor may be further configured to merge the replacement operation with the other operation by adjusting a kernel size of the other operation and a stride size of the other operation based on the number of rows or columns of the matrix.

Other features and aspects will be apparent from the following detailed description, the drawings, and the claims.

Figure 1:
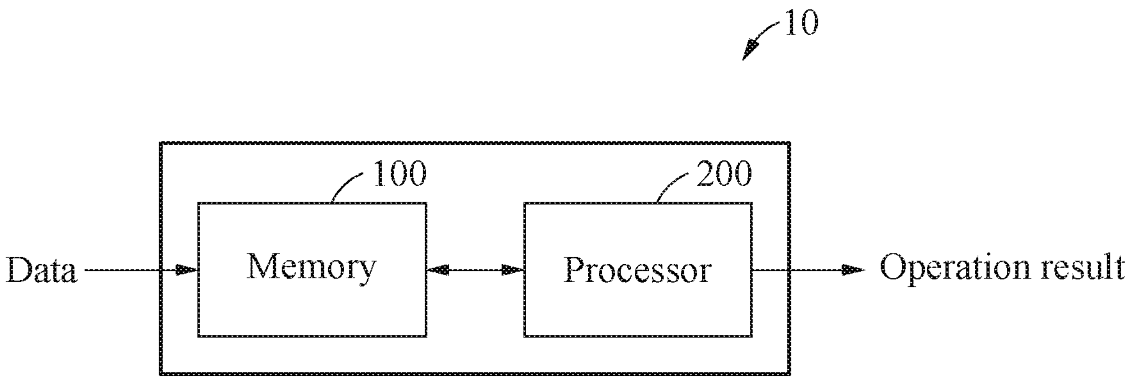
FIG. 1 illustrates an example of a neural network operation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a neural network operation apparatus.

Referring to FIG. 1, a neural network operation apparatus 10 may perform a neural network operation. The neural network operation apparatus 10 may replace or transform a predetermined neural network operation with, or into, another neural network operation.

The neural network operation device 10 may replace a neural network operation that may be undesirably performed by a single operator with a performable operation. The neural network operation device 10 may merge two or more neural network operations into one neural network operation.

Through this, the neural network operation apparatus 10 may improve the operation performing speed of a neural network while efficiently using hardware resources.

The neural network may include a deep neural network (DNN). The neural network may include a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The neural network operation may include an elementwise operation. The elementwise operation may include an elementwise-max operation and an elementwise-sum operation. Hereinafter, an operation may refer to a neural network operation.

The neural network operation apparatus 10 includes a memory 100 and a processor 200. The memory 100 may store instructions (or programs) executable by the processor. For example, the instructions may include instructions to perform an operation of the processor and/or an operation of each element of the processor.

The memory 100 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

The memory 100 may store a matrix on which an operation included in the neural network is to be performed. The memory 100 may store an operation result generated by the processor 200 by processing the operation.

The processor 200 may process data stored in the memory 100. The processor 200 may execute a computer-readable code (for example, software) stored in the memory 100 and instructions triggered by the processor 200.

The "processor 200" may be a data processing device implemented by hardware including a circuit having a physical structure to perform desired operations. For example, the desired operations may include instructions or codes included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 200 may include an operator. The operator may be implemented outside or inside the processor 200. The operator may include a multiply-accumulate (MAC) operator.

The processor 200 may shuffle at least a portion of elements of the matrix on which the operation included in the neural network is to be performed. The processor 200 may shuffle either one or both of rows and columns of a first matrix included in the matrix and either one or both of rows and columns of a second matrix included in the matrix.

The processor 200 may store one row or column of the rows or columns of the first matrix. For example, the processor 200 may store one row or column of the rows or columns of the first matrix in the memory 100.

The processor 200 may store a portion of rows or columns of the matrix at different locations in the memory 100.

The processor 200 may store another row or column of the rows or columns of the first matrix at a location a predetermined interval away from a location at which the one row or column is stored. The predetermined interval may be determined based on the number of matrices on which the operation is to be performed.

The processor 200 may store one row or column of the rows or columns of the second matrix between the location at which the one row or column is stored and the location at which the other row or column is stored.

The processor 200 may shuffle and store the rows or columns of the matrix in the memory 100, or may shuffle the rows or columns directly through the operator and transmit the shuffled matrix. The processor 200 may transmit one row or column of the rows or columns of the first matrix to an operator for a replacement operation. The processor 200 may transmit one row or column of the rows or columns of the second matrix to the operator, so as to be operated adjacent to the one row or column.

The neural network operation may include at least one of an elementwise-sum operation and an elementwise-max operation.

The replacement operation of the neural network operation may include any one or any combination of a max-pool operation, an average pool operation, a sum pool operation, and a convolution operation.

When another operation is to be performed after the operation, the processor 200 may merge (or fuse) the replacement operation with the other operation.

The processor 200 may determine whether the replacement operation and the other operation are mergeable, and merge the replacement operation with the other operation based on a determination result. The same operation may be a mergeable operation. The average pool operation and the sum pool operation may be mergeable. Further, the elementwise-sum operation and the convolution operation may be mergeable.

The processor 200 may merge the replacement operation with the other operation by adjusting a kernel size of the other operation and a stride size of the other operation based on the number of rows or columns of the matrix. Merging operations will be described in detail with reference to FIGS. 9 to 12.

The processor 200 may perform the replacement operation of the operation included in the neural network based on the shuffled matrix.

The processor 200 may replace an elementwise operation with a pooling operation that requires no weight, thereby reducing the use of the memory 100. An elementwise-sum operation performed by utilizing a conventional MAC operator requires a weight for multiplying each element by 1, whereas a pooling operation does not require a weight and thus, may reduce the use of the memory 100. In addition, the processor 200 may improve hardware performance through operation replacement, and improve the operation speed by more efficiently utilizing data parallelism compared to a vector operation.

Further, the processor 200 may enable hardware to process two or more operations at once through merging of operations, thereby reducing the number of cycles of operation. In addition, the processor 200 may merge an elementwise operation that is difficult to parallelize on a channel basis with a convolution operation, thereby increasing the utilization of the operator 250.

Figure 2:
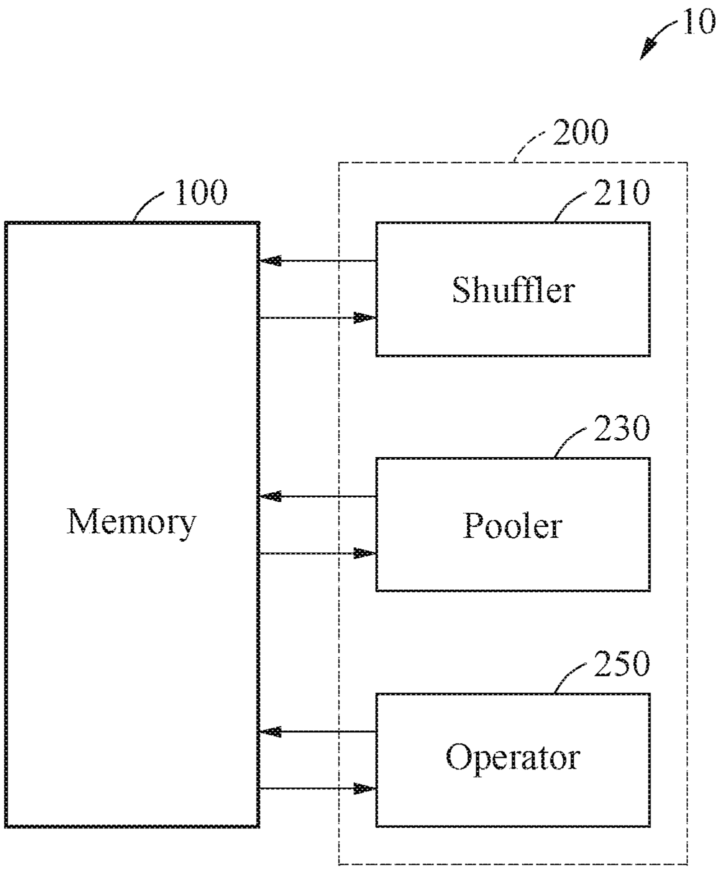
FIG. 2 illustrates an example of a memory and a processor shown in FIG. 1.

FIG. 2 illustrates an example of a memory and a processor shown in FIG. 1.

Referring to FIG. 2, the processor 200 may include a shuffler 210, a pooler 230, and an operator 250. In this example, the shuffler 210 may be implemented outside the processor 200. Alternatively, the shuffling operation may be performed only with the processor 200, without using a separate shuffler 210.

The processor 200 may replace an operation that is not processible, or desired to be processed, by an operator with an operation that is processible or desired to be processed by the operator. For example, if the operator is a MAC operator, the processor 200 may replace an elementwise operation with a pooling operation or a convolution operation. The pooling operation may include a max-pool operation, an average pool operation, and a sum pool operation.

The shuffler 210 may perform shuffling when storing, in the memory 100, a portion of a matrix on which a neural network operation is to be performed. The shuffler 200 may store one row or column of rows or columns of a first matrix.

The shuffler 210 may store another row or column of the rows or columns of the first matrix at a location a predetermined interval away from a location at which the one row or column is stored. The predetermined interval may be determined based on the number of matrices on which the operation is to be performed.

The shuffler 210 may store one row or column of the rows or columns of the second matrix between the location at which the one row or column is stored and the location at which the other row or column is stored.

The shuffler 210 may transmit one row or column of the rows or columns of the first matrix to an operator for a replacement operation. The shuffler 210 may transmit one row or column of the rows or columns of the second matrix to the operator, so as to be operated adjacent to the one row or column.

The pooler 230 may perform a pooling operation. The pooling operation may be an operation of extracting only some elements in a region corresponding to the kernel size from among input data. The pooler 230 may perform a max-pool operation, an average pool operation, and a sum pool operation.

The operator 250 may perform a neural network operation. For example, the operator 250 may perform a MAC operation.

Hereinafter, the shuffling operation will be described in detail with reference to FIGS. 3A to 6.

Figure 3A:
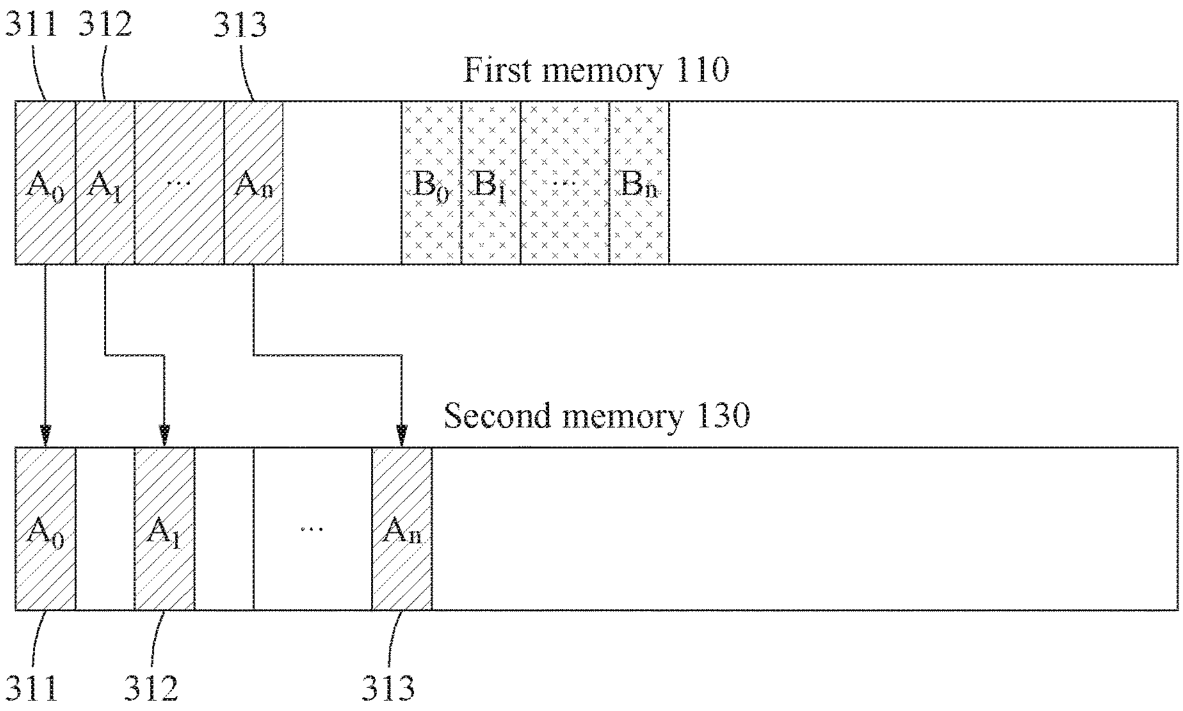
FIGS. 3A and 3B illustrate an example of a shuffling operation.
Figure 3B:
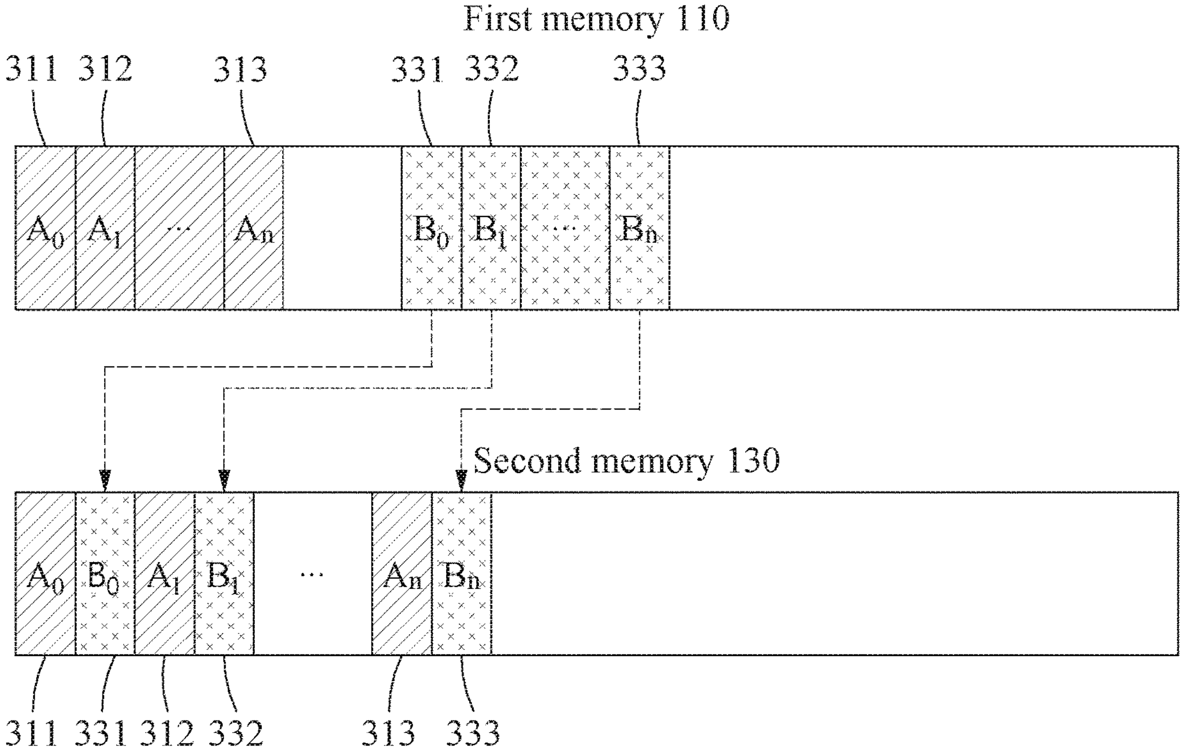

FIGS. 3A and 3B illustrate an example of a shuffling operation.

Referring to FIGS. 3A and 3B, the memory 100 may include a first memory 110 and a second memory 130. The first memory 110 may store a matrix A and a matrix B.

The processor 200 may shuffle some elements of a matrix. The processor 200 may perform shuffling on rows or columns of the matrix. Hereinafter, the shuffling operation of the processor 200 will be described based on the columns of a matrix. However, the processor 200 may also perform shuffling row-wise.

The matrix A may include columns A0 to An, and the matrix B may include columns B0 to Bn. The processor 200 may copy a column 311 of the matrix A stored in the first memory 110 to the second memory 130. Hereinafter, an example in which the first matrix is the matrix A and the second matrix is the matrix B will be described.

The processor 200 may store the column 311 in a first column of the second memory 130. The processor 200 may store a column 313 at a location a predetermined interval away from the location at which the column 311 is stored.

The predetermined interval may be determined based on the number of matrices on which the operation is to be performed. Since the number of matrices on which the operation is to be performed is "2" in the example of FIG. 3A, the column 312 may be stored at a location away from the column 311 by an interval corresponding to two memory regions. Likewise, the processor 200 may store a column 313 at a location a predetermined interval away from the column 312 stored in the second memory 130.

The processor 200 may store a row or column of the second matrix between the location at which a row or column of the first matrix is stored and the location at which another row or column of the first matrix is stored.

In the example of FIG. 3B, the processor 200 may store a column 331 of the matrix B, which is the second matrix, between the column 311 and the column 312 stored in the second memory 130. Similarly, the processor 200 may store a column 332 between the column 312 and the column 313.

The processor 200 may store the shuffled matrix in the second memory 130 through the copying and storing operation described above. In this example, the first memory 110 and the second memory 130 may be implemented as DRAMs and/or SRAMs.

Figure 3C:
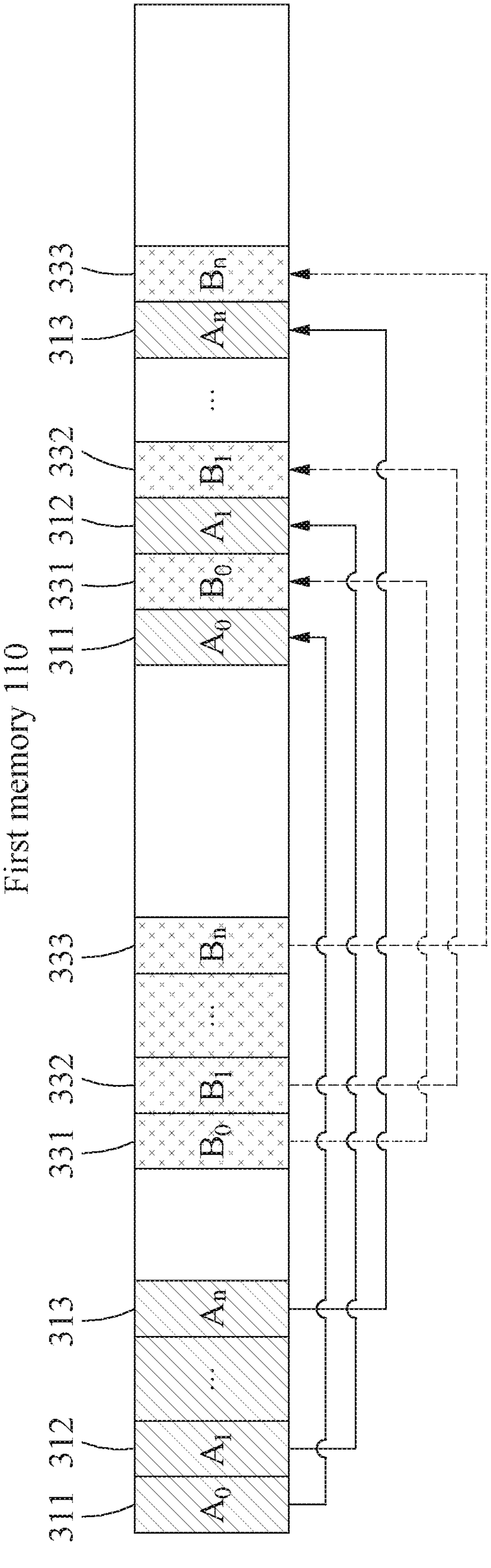
FIG. 3C illustrates an example of a shuffling operation.

FIG. 3C illustrates an example of a shuffling operation.

Referring to FIG. 3C, the processor 200 may store a shuffled matrix in the same memory in which a matrix on which a neural network operation is to be performed is stored. In the example of FIG. 3C, the matrices A and B may be stored in the first memory 110.

The processor 200 may store the column 311 of the matrix A, which is the first matrix, at a predetermined location in the first memory 110. The processor 200 may store the column 312 at a location a predetermined interval away from the location at which the column 311 is stored in the first memory 110. In the same manner, the processor 200 may copy the column 313 and store the column 313 at a location a predetermined interval away from the location at which the column 312 is stored.

The processor 200 may store the column 331 of the matrix B, which is the second matrix, between the column 311 and the column 312 of the first matrix. Similarly, the processor 200 may perform shuffling by storing the columns 332 and 333 of the second matrix in the same manner.

Figure 4:
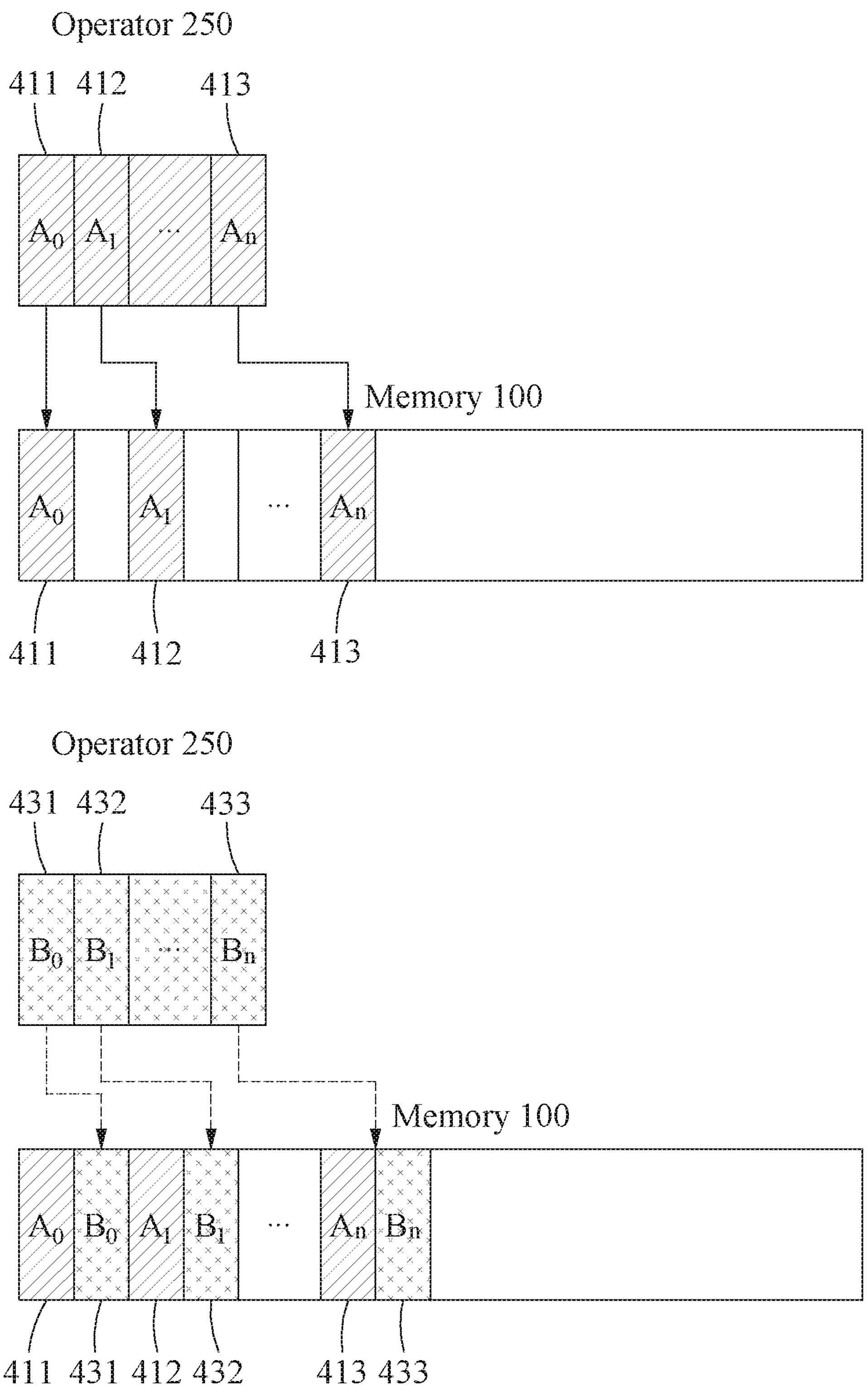
FIG. 4 illustrates an example of a shuffling operation.

FIG. 4 illustrates an example of a shuffling operation.

Referring to FIG. 4, the processor 200 may perform shuffling by storing an output of the operator 250 with a predetermined interval in the memory 100.

For example, when the operator 250 outputs a column 411 of a matrix A, the processor 200 may store the column 411 in a first region of the memory 100. Thereafter, the processor 200 may store a column 412 output from the operator 250 at a location apart from the column 411 stored in the memory 100 by a predetermined interval.

The predetermined interval may be determined based on the number of matrices on which an operation is to be performed, as described above. In the example of FIG. 4, the predetermined interval may be 2.

When all the elements of the matrix A are stored, the processor 200 may store an output of the operator 250 by a matrix B in the memory 100. When the operator 250 outputs a column 431 of the matrix B, the processor 200 may store the column 431 between the column 411 and the column 412. Similarly, the processor 200 may store a column 432 between the column 412 and the column 413.

By performing shuffling in the process of writing the outputs of the operator 250 to the memory 100, the shuffling may be performed without using a separate memory region for shuffling.

Figure 5:
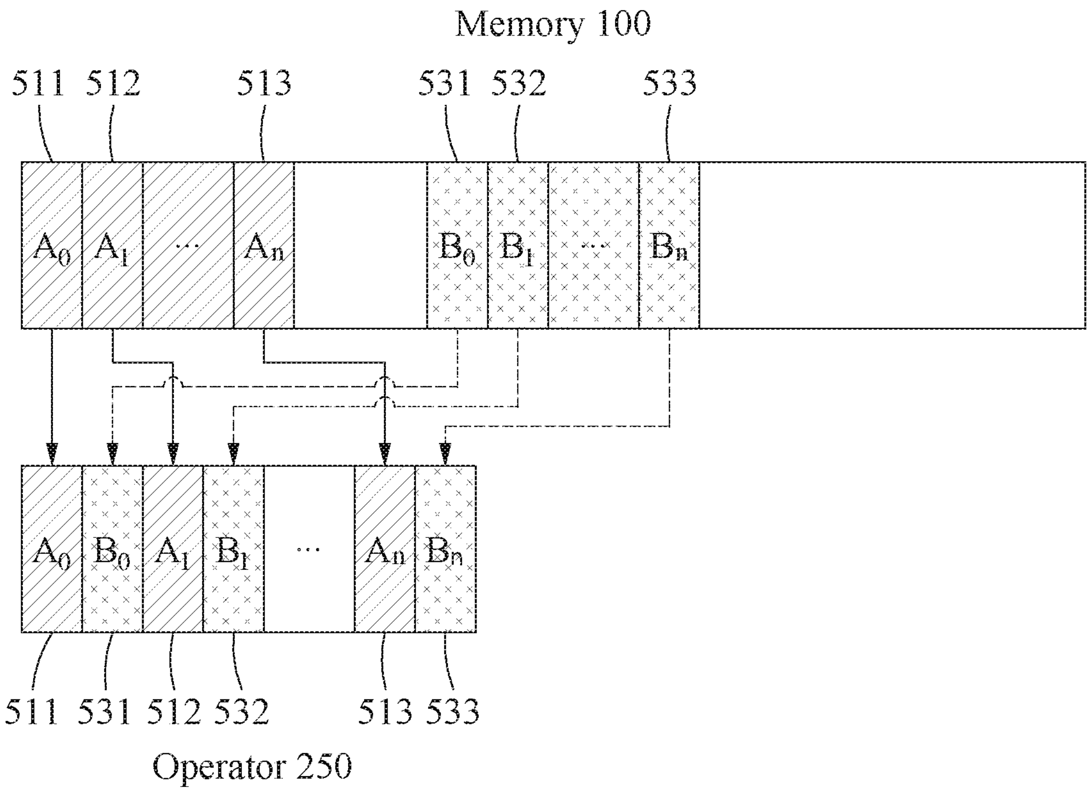
FIG. 5 illustrates an example of a shuffling operation.

FIG. 5 illustrates an example of a shuffling operation.

Referring to FIG. 5, the processor 200 may perform matrix shuffling by shuffling an input of the operator 250.

The memory 100 may store a matrix A and a matrix B. The processor 200 may perform shuffling by alternately inputting a portion of the elements of the matrix A and a portion of the elements of the matrix B into the operator 250.

The processor 200 may first input a column 511 of the matrix A into the operator 250, and secondly input a column 531 of the matrix B into the operator 250. Thereafter, the processor 200 may input a column 512 of the matrix A into the operator 250 and input a column 532 of the matrix B into the operator 250.

In other words, the processor 200 may perform shuffling by alternately inputting a portion of the elements of a first matrix and a portion of the elements of a second matrix into the operator 250.

Figure 6:
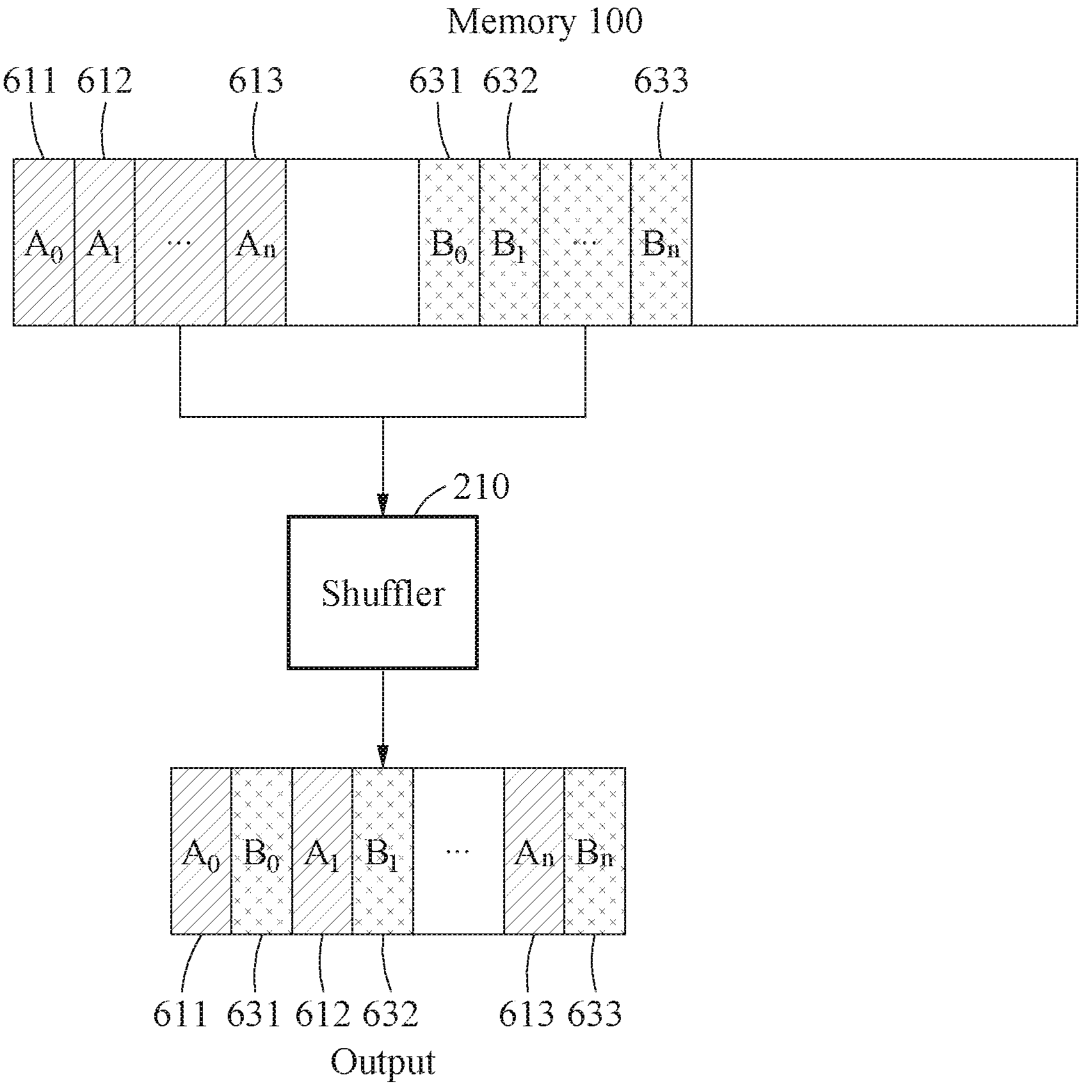
FIG. 6 illustrates an example of a shuffling operation using a separate shuffler.

FIG. 6 illustrates an example of a shuffling operation using a separate shuffler.

Referring to FIG. 6, the processor 200 may perform shuffling using the shuffler 210 configured as separate hardware for performing shuffling. In this example, the operation of the shuffler 210 may be the same as the shuffling operation described with reference to FIGS. 3A to 5.

An output of the shuffler 210 may be connected to the operator 250 or the memory 100. By configuring the shuffler 210 separately, the shuffling efficiency may improve.

Hereinafter, a process of replacing an elementwise-max operation with a max-pool operation will be described in detail with reference to FIGS. 7A to 7C.

Figure 7A:
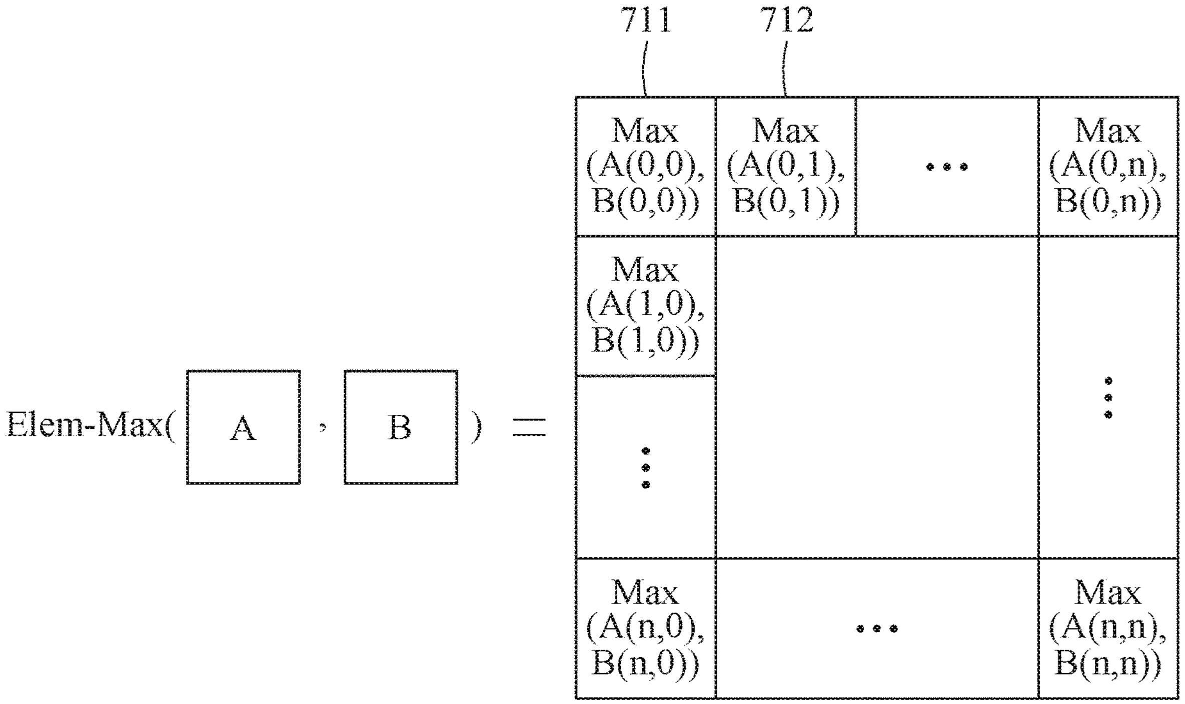
FIG. 7A illustrates an example of an elementwise-max operation.
Figure 7B:
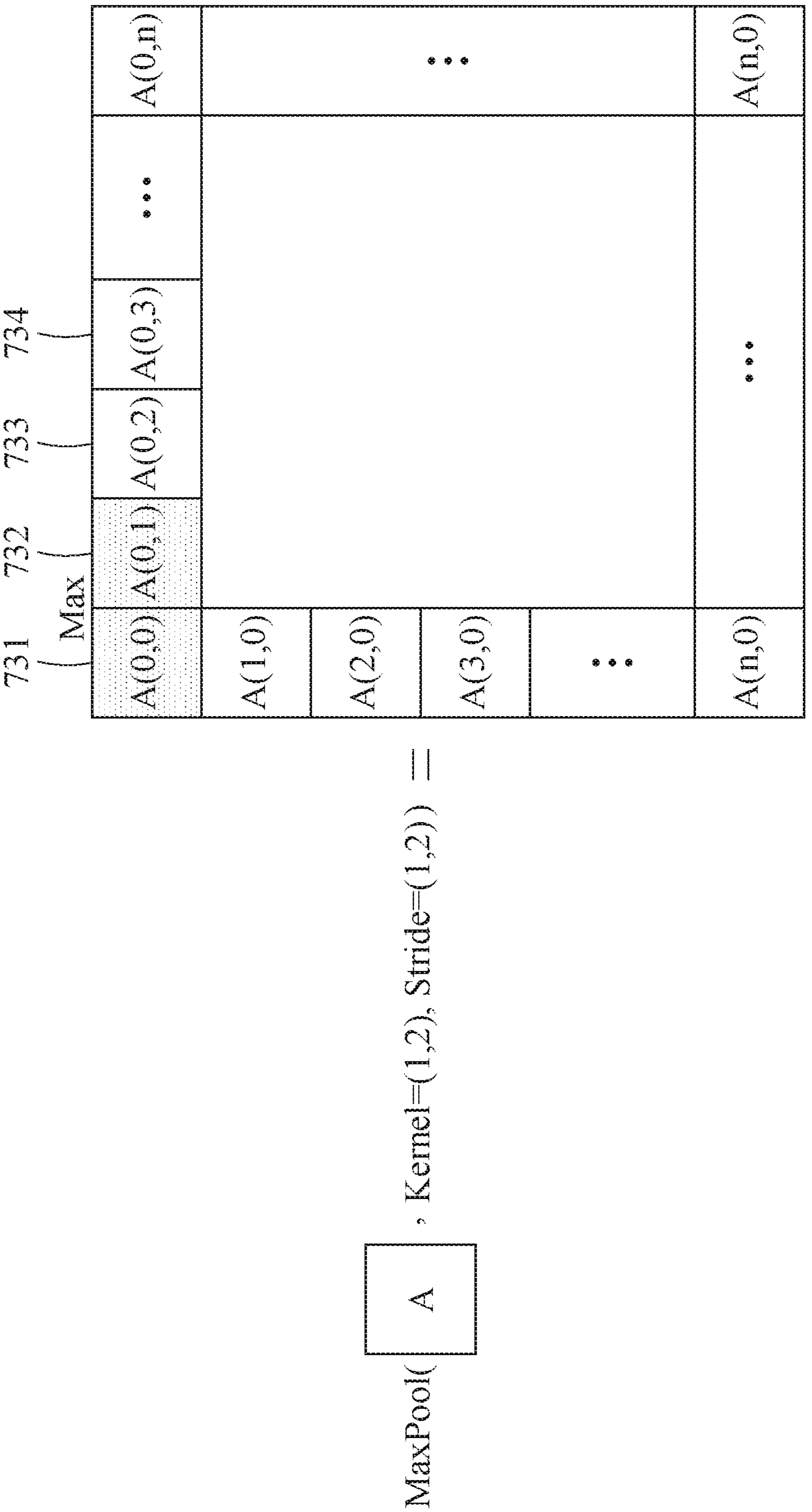
FIG. 7B illustrates an example of a max-pool operation.
Figure 7C:
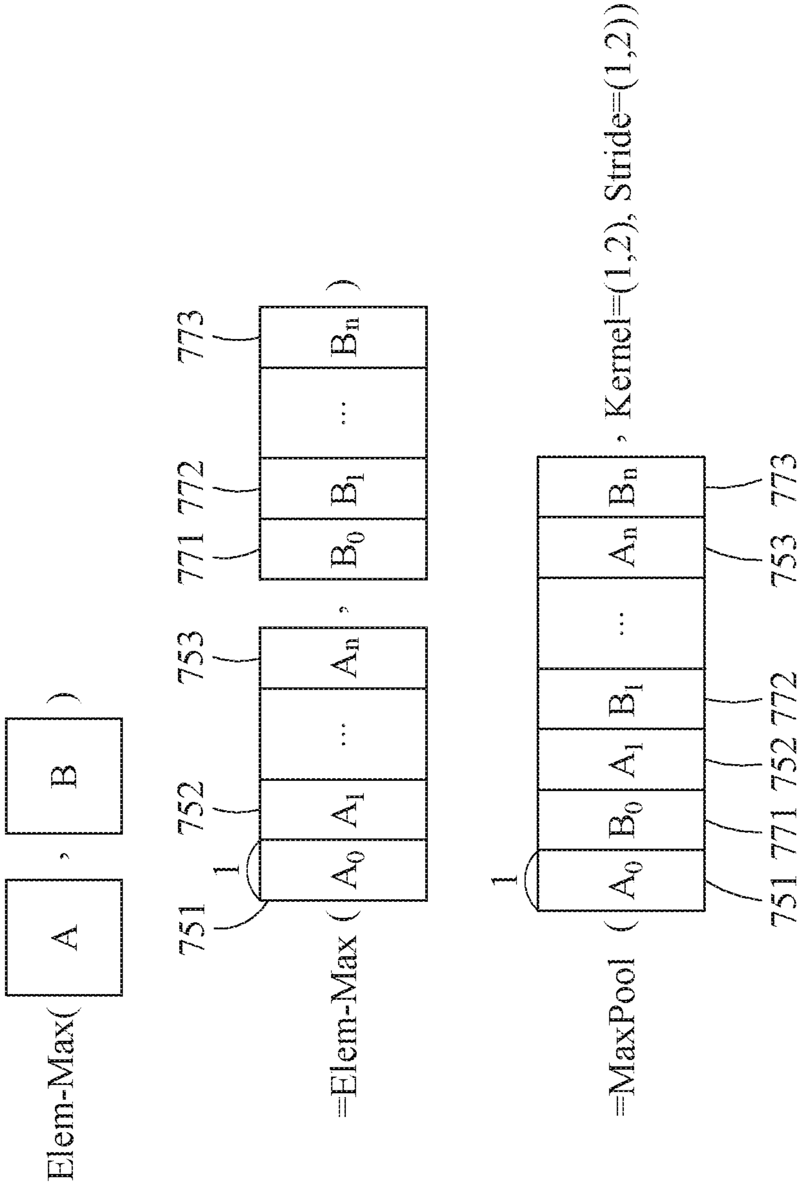
FIG. 7C illustrates an example of replacing an elementwise-max operation with a max-pool operation.

FIG. 7A illustrates an example of an elementwise-max operation, FIG. 7B illustrates an example of a max-pool operation, and FIG. 7C illustrates an example of replacing an elementwise-max operation with a max-pool operation.

Referring to FIGS. 7A to 7C, the processor 200 may perform an operation by shuffling a matrix on which the operation is to be performed and replacing one neural network operation with another neural network operation.

An elementwise-max operation may be an operation for generating a new matrix by comparing elements of operand matrices and extracting maximum elements therefrom.

For example, in the example of FIG. 7A, when an elementwise-max operation is performed on matrices A and B, a first element 711 of an output matrix may be a value obtained by performing a max operation on a first element A(0, 0) of the matrix A and a first element B(0, 0) of the matrix B.

Similarly, a second element 712 of the output matrix may be a value obtained by performing a max operation on a second element A(0, 1) of the matrix A and a second element B(0, 1) of the matrix B.

By performing the same operation on the remaining elements, the elementwise-max operation for the two matrices A and B may be performed.

A max-pool operation may be an operation for extracting a maximum value in a region overlapping a kernel with respect to an input matrix. In the example of FIG. 7B, a kernel may be a shaded portion.

In FIG. 7B, the kernel size is (1, 2), and the kernel size may be adjusted based on the number of operand matrices on which shuffling is to be performed. A stride may be a distance a kernel moves on a matrix on which an operation is to be performed.

In the example of FIG. 7B, when the max-pool operation is performed, a first element of an output matrix may be extracted by performing a max operation on a first element 731 and a second element 732 of a matrix A. After that, the same operation may be repeated by moving an interval corresponding to the stride. In the example of FIG. 7B, the stride is (1, 2). Thus, a value of a second element of the output matrix may be extracted by performing a max operation on an element 733 and an element 734.

The processor 200 may replace an elementwise-max operation with a max-pool operation by shuffling a portion of the elements of the matrix. The processor 200 may shuffle a portion of the elements of the matrix A and a portion of the elements of the matrix B.

The example of FIG. 7C describes a case of performing shuffling column-wise. However, shuffling row-wise may also be possible.

The processor 200 may alternately arrange columns 751 to 753 of the matrix A and columns 771 to 773 of the matrix B through the shuffling process described above. In the shuffled matrix, the column 771 of the matrix B may be arranged on the right side of the column 751 of the matrix A, and the column 752 of the matrix A may be arranged on the right side of the column 771 of the matrix B. Similarly, the column 772 of the matrix B may be arranged on the right side of the column 752 of the matrix A. The remaining columns may also be shuffled as described above.

The processor 200 may perform a replacement operation of the neural network operation based on the shuffled matrix. FIG. 7C shows an example in which the processor 200 replaces an elementwise-max operation of the matrices A and B with a max-pool operation of the shuffled matrix.

The processor 200 may output the same result as the elementwise-max operation of the matrices A and B by performing the max-pool operation on the matrix in which the matrices A and B are shuffled.

In this example, the kernel size and the stride size of the max-pool operation may be determined based on the number of operand matrices on which the neural network operation is to be performed. For example, if there are two operand matrices, the kernel of the max-pool operation may be determined to be (1, 2), and the stride thereof may be determined to be (1, 2). If there are three operand matrices, the kernel of the max-pool operation may be determined to be (1, 3), and the stride thereof may be determined to be (1, 3).

Hereinafter, a process of replacing an elementwise-sum operation with an average pool operation or a sum pool operation will be described in detail with reference to FIGS. 8A to 8C.

Figure 8A:
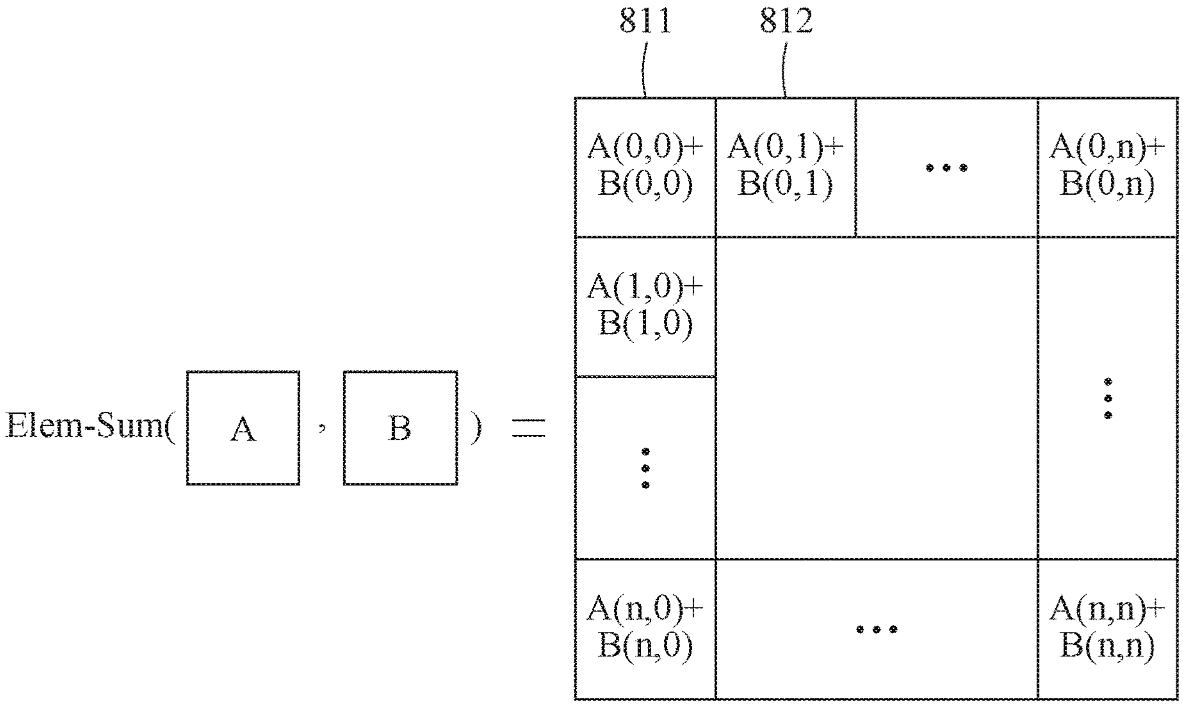
FIG. 8A illustrates an example of an elementwise-sum operation.
Figure 8B:
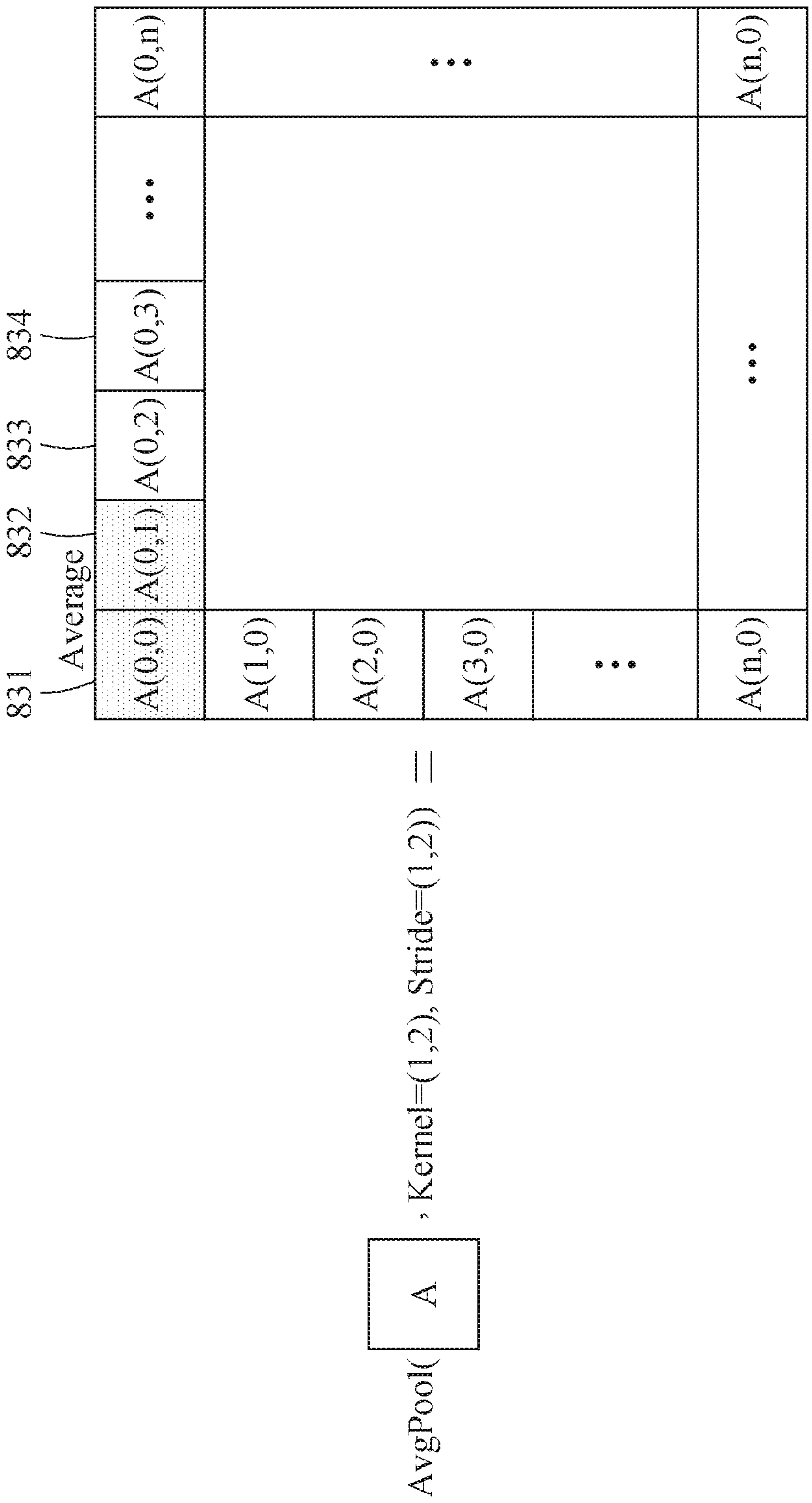
FIG. 8B illustrates an example of an average pool operation.
Figure 8C:
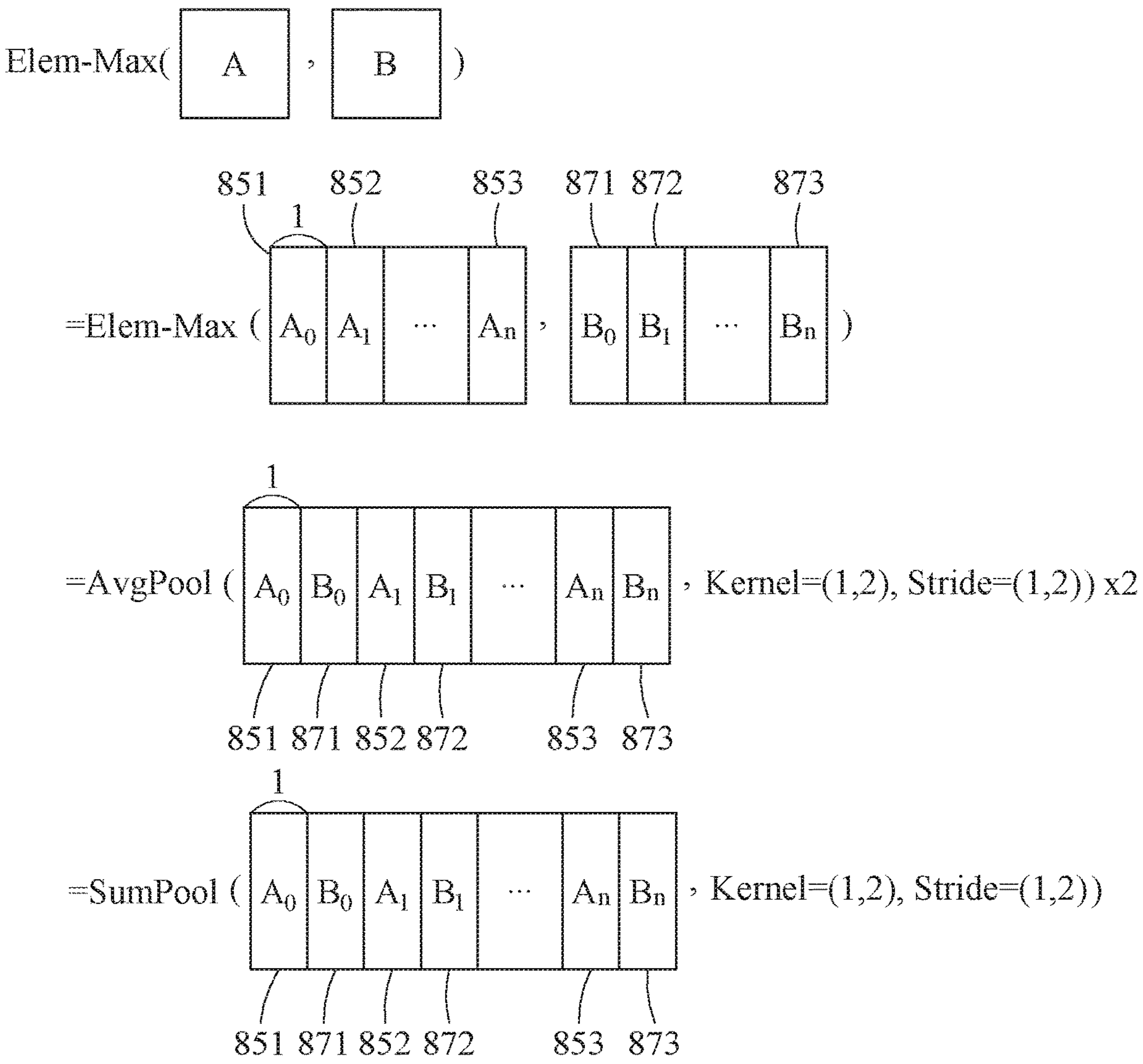
FIG. 8C illustrates an example of replacing an elementwise-sum operation with an average pool operation or a sum pool operation.

FIG. 8A illustrates an example of an elementwise-sum operation, FIG. 8B illustrates an example of an average pool operation, and FIG. 8C illustrates an example of replacing an elementwise-sum operation with an average pool operation or a sum pool operation.

Referring to FIGS. 8A to 8C, an elementwise-sum operation may be an operation for adding elements of operand matrices.

For example, when an elementwise-sum operation is performed on matrices A and B, a first element 811 of an output matrix may be the sum of a first element A(0, 0) of the matrix A and a first element B(0, 0) of the matrix B. A second element of the output matrix may be the sum of a second element A(0, 1) of the matrix A and a second element B(0, 1) of the matrix B.

The remaining elements of the output matrix may also be calculated in the same manner as described above.

An average pool operation may be an operation for extracting the average of elements of a matrix in a region overlapping a kernel. For example, if the kernel size is (1, 2) as shown in FIG. 8B, a first element of an output matrix of the average pool operation may have an average value of a first element A(0, 0) and a second element A(0, 1) of the matrix A.

Thereafter, a second element of the output matrix of the average pool operation may be an average value for a region overlapping the kernel after shifting by the size of the stride. In the example of FIG. 8B, since the size of the stride is (1, 2), the second element of the average pool operation may have an average value of an element A(0, 2) and an element A(0, 3) of the matrix A.

A sum pool operation may be an operation for extracting the sum of elements of a matrix in a region overlapping a kernel. The description of the kernel and the stride of the sum pool operation may be the same as that of the average pool operation.

The processor 200 may replace an elementwise-sum operation with an average pool operation by shuffling a portion of the elements of the matrix. The processor 200 may shuffle a portion of the elements of the matrix A and a portion of the elements of the matrix B. The example of FIG. 8C describes a case of performing shuffling column-wise. However, shuffling row-wise may also be possible.

The processor 200 may alternately arrange columns 851 to 853 of the matrix A and columns 871 to 873 of the matrix B through the shuffling process described above. In the shuffled matrix, the column 871 of the matrix B may be arranged on the right side of the column 851 of the matrix A, and the column 852 of the matrix A may be arranged on the right side of the column 871 of the matrix B. Similarly, the column 872 of the matrix B may be arranged on the right side of the column 852 of the matrix A. The remaining columns may also be shuffled as described above.

The processor 200 may perform a replacement operation of the neural network operation based on the shuffled matrix. FIG. 8C shows an example in which the processor 200 replaces an elementwise-sum operation of the matrices A and B with an average pool operation or a sum pool operation of the shuffled matrix.

The processor 200 may output the same result as the elementwise-sum operation of the matrices A and B by performing the average pool operation on the matrix in which the matrices A and B are shuffled and then multiplying the operation result by 2.

The processor 200 may output the same result as the elementwise-sum operation of the matrices A and B by performing the sum pool operation on the matrix in which the matrices A and B are shuffled.

In this example, the kernel size and the stride size of the max-pool operation may be determined based on the number of operand matrices on which the neural network operation is to be performed. For example, if there are two operand matrices, the kernel of the max-pool operation may be determined to be (1, 2), and the stride thereof may be determined to be (1, 2). If there are three operand matrices, the kernel of the max-pool operation may be determined to be (1, 3), and the stride thereof may be determined to be (1, 3).

Hereinafter, a process of merging operations will be described in detail with reference to FIGS. 9 and 12.

Figure 9:
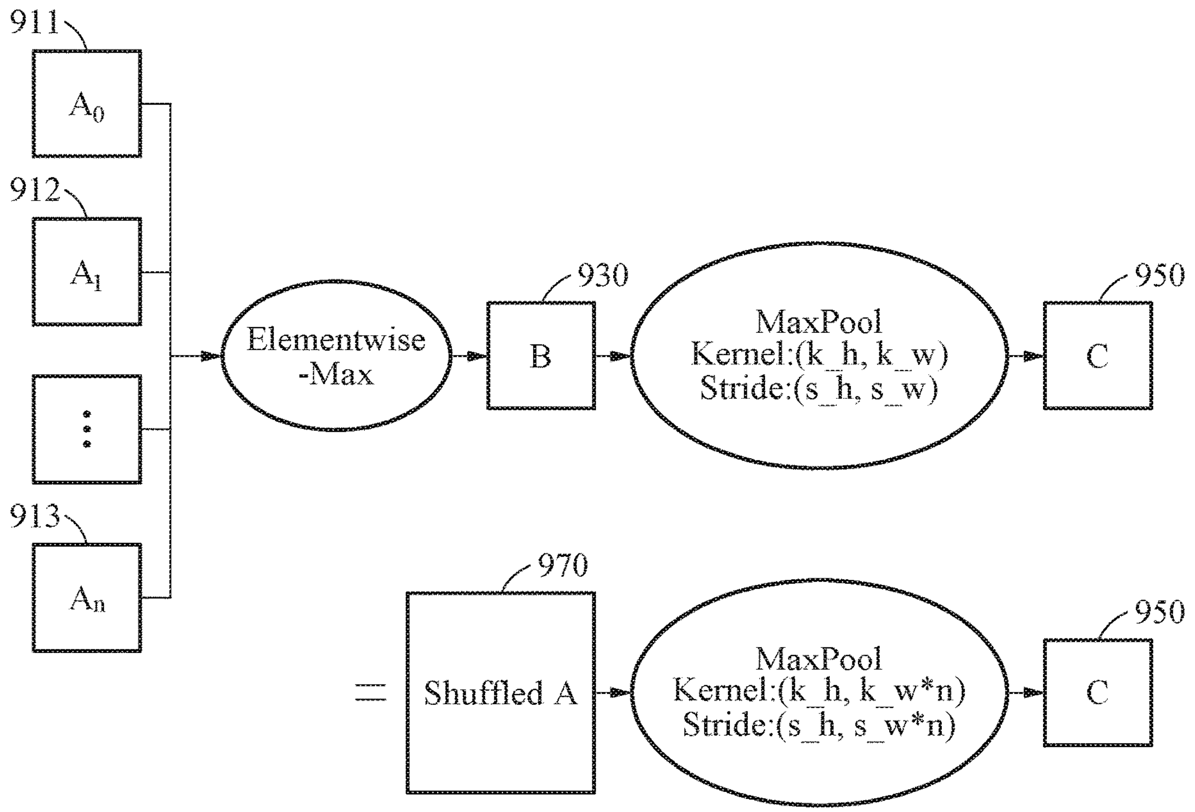
FIG. 9 illustrates an example of merging neural network operations.

FIG. 9 illustrates an example of merging neural network operations.

Referring to FIG. 9, if another operation is to be performed after an operation, the processor 200 may merge (or fuse) a replacement operation with the other operation.

FIG. 9 shows an example of generating a final matrix C 950 by performing an elementwise-max operation on a matrix A including columns 911 to 913 and performing a max-pool operation on a matrix B 930, which is the result of the elementwise-max operation. In this example, the processor 200 may perform shuffling on the matrix A in the manner as described above, and perform the max-pool operation, thereby merging the elementwise operation and the max-pool operation into one max-pool operation.

The processor 200 may determine whether an operation to be performed after the max pool operation, which is a replacement operation, is mergeable, and then merge the two operations into one operation in response to the determination that the following operation is the same operation.

The processor 200 may merge the elementwise operation and the max-pool operation into one max-pool operation. In this case, the processor 200 may adjust the kernel size and the stride size of the merged operation based on the kernel size and the stride size of the replacement operation or the other operation to be merged.

In the example of FIG. 9, the kernel size of the other operation (for example, a max-pool operation) before merging may be (k_h, k_w), and the stride size thereof may be (s_h, s_w). The processor 200 may adjust the kernel size of the merged max-pool operation to (k_h, k_w×n) and the stride size thereof to (s_h, s_w×n).

Here, k_h denotes the kernel height, and k_w denotes the kernel width. s_h denotes the stride height, and s_w denotes the stride width. n denotes the number of matrices on which an operation is to be performed. In the example of FIG. 9, n may be 3.

FIG. 9 shows an example in which the width of the kernel size and the width of the stride size is multiplied by n since operations are merged after shuffling the matrix column-wise. However, if the matrix is shuffled row-wise, the processor 200 may multiply the height by n.

To perform the merged operation, the processor 200 may generate a matrix C 970, which is the final result, by shuffling the elements 911 to 913 included in the matrix A and performing a max-pool operation in which the kernel and the stride are adjusted, on the shuffled matrix A 970.

Figure 10:
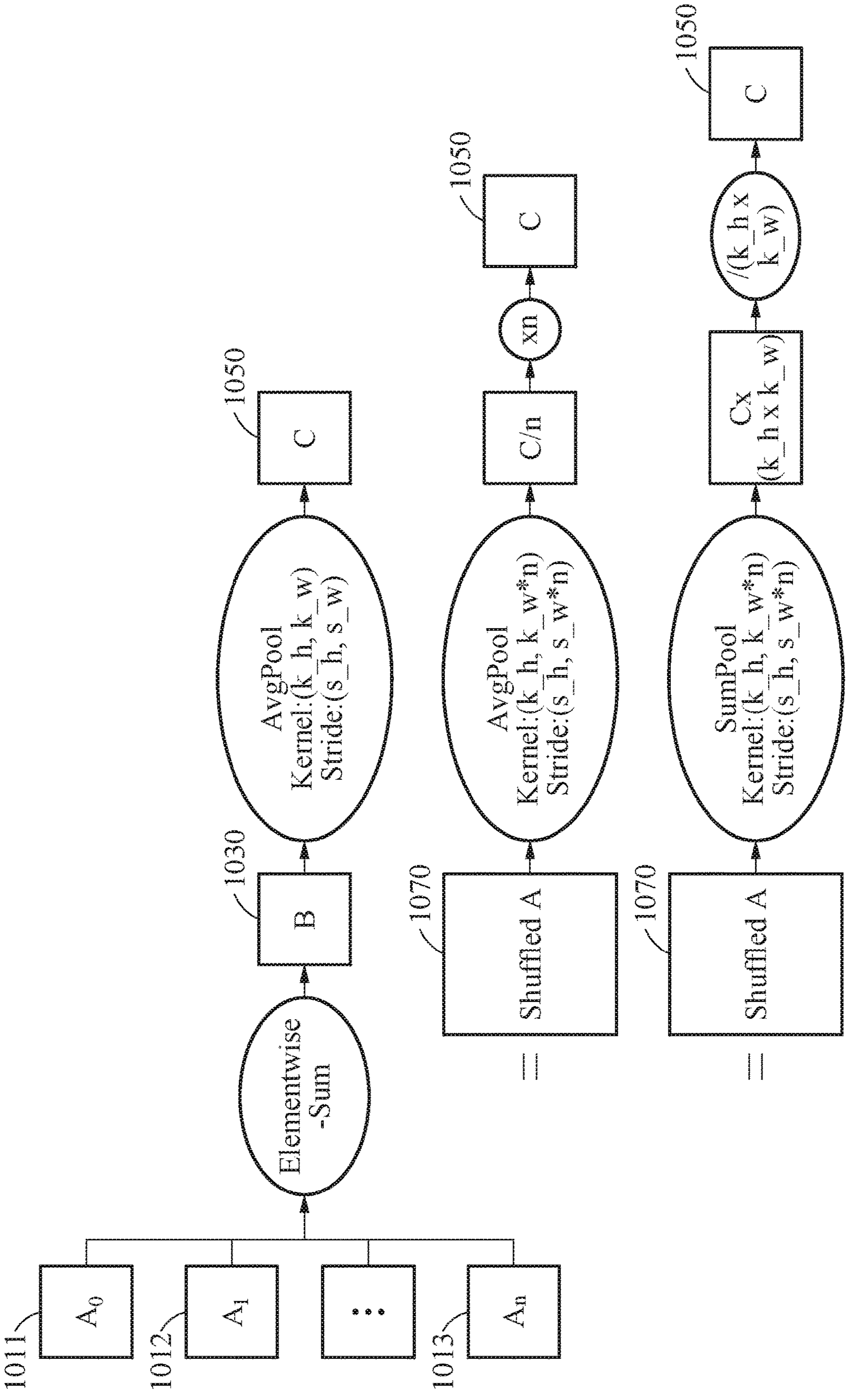
FIG. 10 illustrates an example of merging neural network operations.

FIG. 10 illustrates an example of merging neural network operations.

Referring to FIG. 10, when one operation and another operation are to be successively performed on a predetermined matrix, the processor 200 may merge (or fuse) a replacement operation of the one operation with the other operation.

FIG. 10 shows an example of performing an elementwise-sum operation on a matrix A including columns 1011 to 1013 and then performing an average pool operation or a sum pool operation on a matrix B 1030, which is the result of the elementwise-sum operation.

In this example, the processor 200 may perform shuffling on the matrix A in the manner as described above, thereby merging the elementwise-sum operation and the average pool operation into one average pool operation. Alternately, the processor 200 may perform shuffling on the matrix A in the manner as described above, thereby merging the elementwise-sum operation and the average pool operation into one sum pool operation.

The processor 200 may determine whether an operation to be performed after the average pool operation or the sum pool operation, which is a replacement operation, is mergeable, and then merge the two operations into one operation in response to the determination that the following operation is the same operation.

As described above, the same operation may be mergeable, and the average pool operation and the sum pool operation may be mergeable.

The processor 200 may merge the average pool operation (or sum pool operation) that is the replacement operation of the elementwise operation to be performed on the matrix A and the following average pool operation (or sum pool operation) into one average pool operation (or sum pool operation).

In this case, the processor 200 may adjust the kernel size and the stride size of the merged operation based on the kernel size and the stride size of the other operation.

In the example of FIG. 10, the kernel size of the other operation before merging may be (k_h, k_w), and the stride size thereof may be (s_h, s_w). The processor 200 may adjust the kernel size of the merged average pool (or sum pool) operation to (k_h, k_w×n) and the stride size thereof to (s_h, s_w×n).

Here, k_h denotes the kernel height, and k_w denotes the kernel width. s_h denotes the stride height, and s_w denotes the stride width. n denotes the number of matrices on which an operation is to be performed. In the example of FIG. 10, n may be 3.

FIG. 10 shows an example in which the width of the kernel size and the width of the stride size is multiplied by n since operations are merged after shuffling the matrix column-wise. However, if the matrix is shuffled row-wise, the processor 200 may multiply the height by n.

In this example, if the merged operation is an average pool operation, the result of performing the operation may be a value obtained by dividing an intended result by n. Thus, the processor 200 may multiply the result by n to derive the originally intended result. In other words, if the merged operation is an average pool operation, the processor 200 may calculate a matrix C 1050, which is the final result, by multiplying the result of the merged average pool operation by n.

In this example, if the merged operation is a sum pool operation, the result of performing the operation may be a value obtained by multiplying an intended result by (k_h×k_w). Thus, the processor 200 may divide the result by (k_h×k_w) to derive the originally intended result. In other words, if the merged operation is a sum pool operation, the processor 200 may output the result of the merged operation by dividing the result of the merged sum pool operation by (k_h×k_w).

Hereinafter, a process of merging an elementwise-sum operation with a convolution operation will be described in detail with reference to FIGS. 11 and 12.

Figure 11:
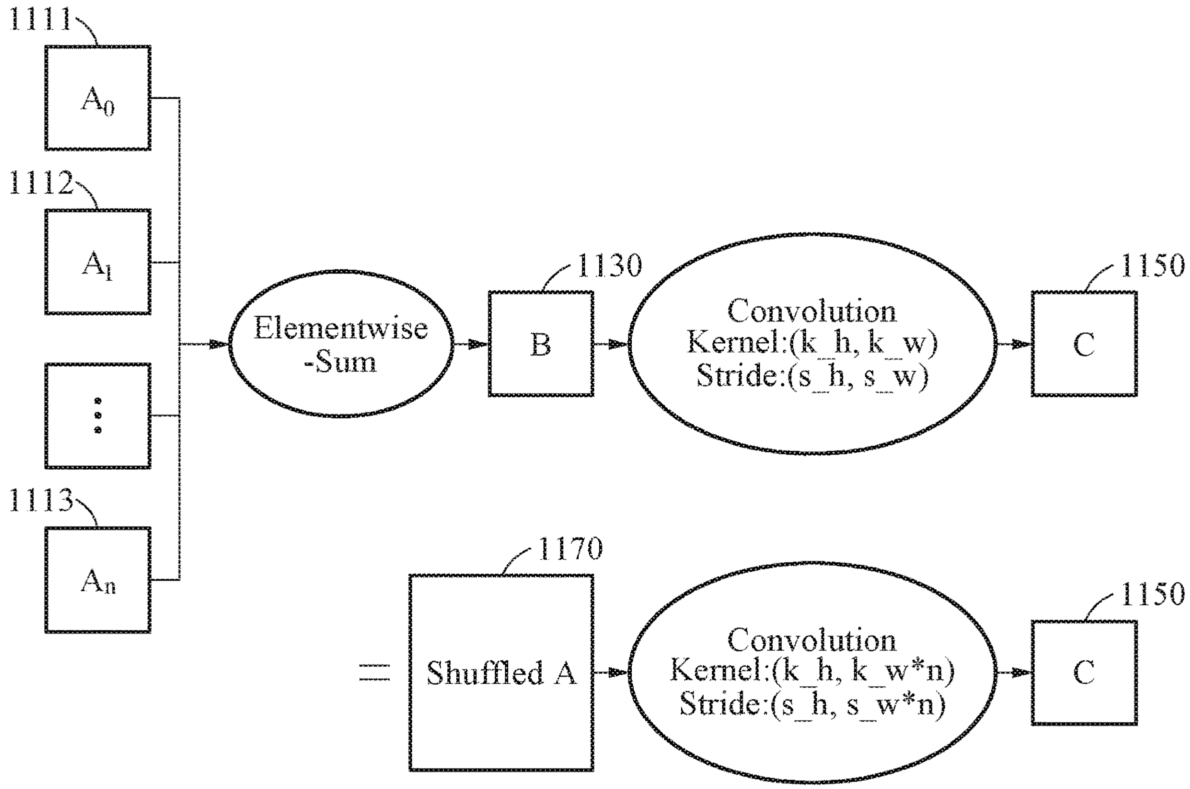
FIG. 11 illustrates an example of merging neural network operations.
Figure 12:
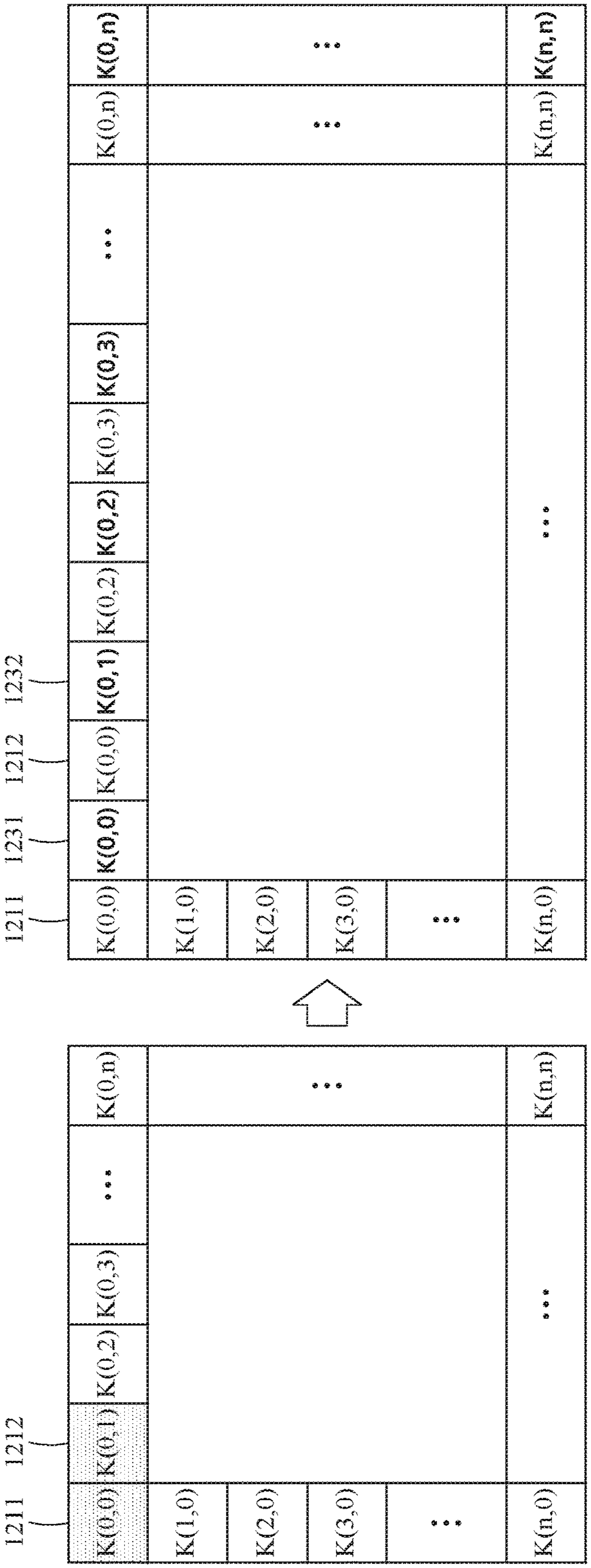
FIG. 12 illustrates an example of kernel rearrangement for merging neural network operations.

FIG. 11 illustrates an example of merging neural network operations, and FIG. 12 illustrates an example of kernel rearrangement for merging neural network operations.

Referring to FIGS. 11 and 12, the processor 200 may merge an elementwise-sum operation with a convolution operation. FIG. 11 shows an example of generating a matrix C 1150 by calculating a matrix B 1130 through an elementwise-sum operation on a matrix A including columns 1111 to 1113 and then, performing a convolution operation of the matrix B 1130 and a predetermined filter (or kernel).

The processor 200 may merge an elementwise-sum operation and its following convolution operation into one convolution operation according to the distributive property. Since Accumulate((An+Bn)×Filter)==Accumulate(An×Filter+Bn×Filter) is satisfied by the distributive property, the processor 200 may merge the elementwise-sum operation with the convolution operation.

The processor 200 may adjust the kernel size and the stride size of the merged operation based on the kernel size and the stride size of a replacement operation or the other operation to be merged.

The processor 200 may merge the elementwise-sum operation with the convolution operation by increasing the filter size of the convolution operation by a factor of n and repeating the elements of each filter n number of times.

FIG. 12 shows an example in which n is 2. In this example, the processor 200 may generate an element 1231 by copying an element 1211 of the kernel of the convolution operation before merging, and generate an element 1232 by copying an element 1212. Similarly, the processor 200 may increase the kernel size by a factor of n by copying the remaining elements of the kernel. Further, the processor 200 may increase the stride size by a factor of n.

In the example of FIG. 11, the kernel size of the other operation before merging may be (k_h, k_w), and the stride size thereof may be (s_h, s_w). The processor 200 may adjust the kernel size of the merged convolution operation to (k_h, k_w×n) and the stride size thereof to (s_h, s_w×n).

Here, k_h denotes the kernel height, and k_w denotes the kernel width. s_h denotes the stride height, and s_w denotes the stride width. n denotes the number of matrices on which an operation is to be performed.

In this example, when shuffling is performed heightwise (or based on the rows of the matrix), the processor 200 may multiply the kernel height and the stride height by n.

Figure 13:
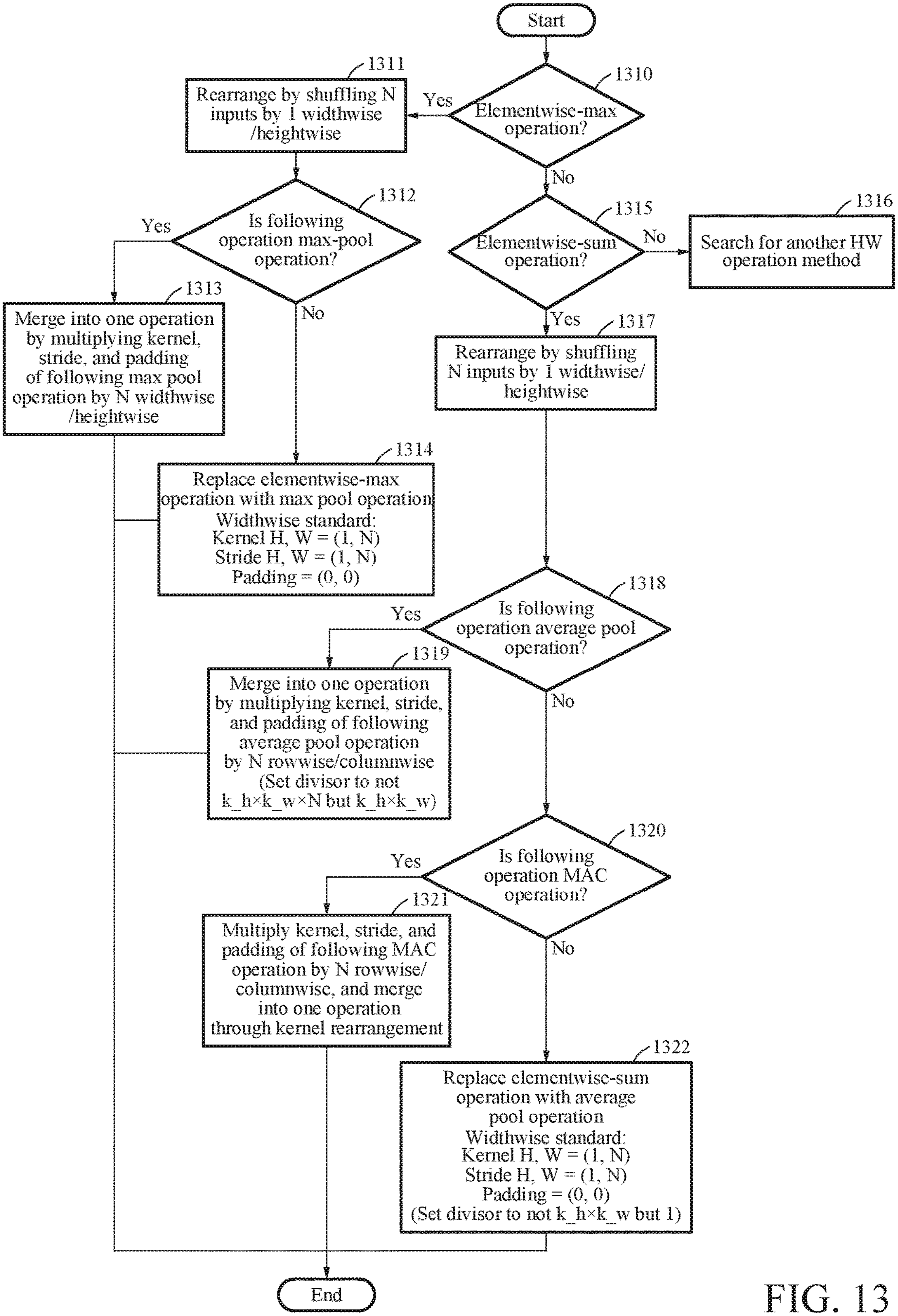
FIG. 13 illustrates an example of replacing a neural network operation and merging neural network operations.

FIG. 13 illustrates an example of replacing a neural network operation and merging neural network operations.

Referring to FIG. 13, in operation 1310, the processor 200 may determine whether an operation to be performed is an elementwise-max operation. If the operation to be performed is an elementwise-max operation, the processor 200 may perform rearrangement by shuffling N inputs by 1 widthwise or heightwise, in operation 1312. In this example, the shuffling operation may be the same as that described with reference to FIGS. 3A to 6.

In operation 1312, the processor 200 may determine whether an operation following the operation to be performed is a max-pool operation. If the following operation is a max-pool operation, the processor 200 may merge the operations into one operation by multiplying a kernel, a stride, and padding of the following max-pool operation by N widthwise/heightwise, in operation 1313.

If the following operation is not a max-pool operation, the processor 200 may replace the elementwise-max operation with a max-pool operation, in operation 1314. In this example, if the shuffling is performed based on the columns of the matrix, the processor 200 may adjust the kernel to (1, N) and the stride to (1, N) widthwise, and set the padding to (0, 0). If the shuffling is performed based on the rows of the matrix, the processor 200 may adjust the kernel height and the stride height.

If the operation to be performed first is not an elementwise-max operation, the processor 200 may determine whether the operation to be performed is an elementwise-sum operation, in operation 1315. If the operation to be performed is not an elementwise-sum operation, the processor 200 may search for another operation method that uses another hardware, in operation 1316. If the operation to be performed is an elementwise-sum operation, the processor 200 may perform rearrangement by shuffling N inputs by 1 widthwise or heightwise, in operation 1317.

In operation 1318, the processor 200 may determine whether an operation following the elementwise-sum operation is an average pool operation. If the following operation is an average pool operation, the processor 200 may merge the operations into one operation by multiplying a kernel, a stride, and padding of the average pool operation by N row-wise or column-wise, in operation 1319. In this example, the processor 200 may set a divisor to not k_h×k_w×N but k_h×k_w.

If the following operation is not an average pool operation, the processor 200 may determine whether the following operation is a MAC operation, in operation 1320. The MAC operation may include an operation formed of summation and multiplication. For example, the MAC operation may include a convolution operation or a depthwise convolution operation.

If the following operation is a MAC operation, the processor 200 may multiply a kernel, a stride, and padding of the MAC operation by N row-wise and column-wise, and merge the initial operation and the following operation into one MAC operation through kernel rearrangement, in operation 1321.

If the following operation is not a MAC operation, the processor 200 may replace the elementwise-sum operation with an average pool operation, in operation 1322. In this example, when the matrix is shuffled column-wise, the processor 200 may set the kernel to (1, N), set the stride to (1, N), and set the padding to (0, 0). Further, the processor 200 may set the divisor to not k_h×k_w but 1.

Figure 14:
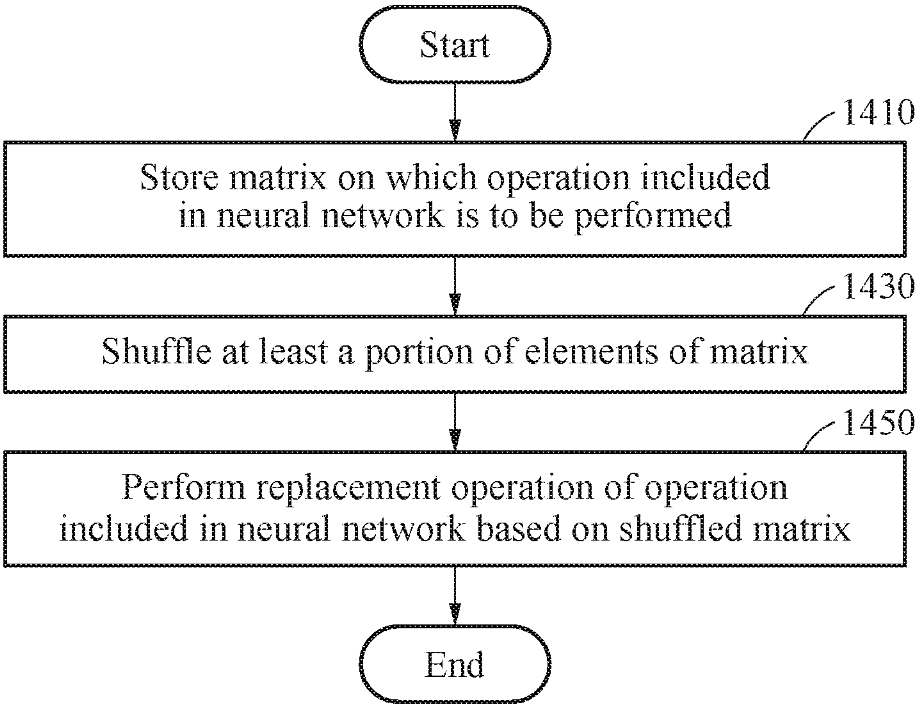
FIG. 14 illustrates an example of a flow of operation of the neural network operation apparatus of FIG. 1.

FIG. 14 illustrates an example of a flow of operation of the neural network operation apparatus of FIG. 1.

In operation 1410, the memory 100 may store a matrix on which an operation included in a neural network is to be performed. The operation included in the neural network may include at least one of an elementwise-sum operation and an elementwise-max operation.

In operation 1430, the processor 200 may shuffle at least a portion of elements of the matrix. The processor 200 may shuffle at least one of rows or columns of a first matrix included in the matrix and at least one of rows or columns of a second matrix included in the matrix.

In detail, the processor 200 may store one row or column of the rows or columns of the first matrix. The processor 200 may store another row or column of the rows or columns of the first matrix at a location a predetermined interval away from a location at which the one row or column is stored.

Then, the processor 200 may store one row or column of the rows or columns of the second matrix between the location at which the one row or column is stored and the location at which the other row or column is stored. In this example, the predetermined interval may be determined based on the number of matrices on which the operation is to be performed.

According to another shuffling method, the processor 200 may transmit one row or column of the rows or columns of the first matrix to an operator for a replacement operation. The processor 200 may transmit one row or column of the rows or columns of the second matrix to the operator, so as to be operated adjacent to the one row or column.

In operation 1450, the processor 200 may perform a replacement operation of the operation based on the shuffled matrix. The replacement operation may include any one or any combination of a max-pool operation, an average pool operation, a sum pool operation, and a convolution operation.

If another operation is to be performed after the operation, the processor 200 may merge the replacement operation with the other operation. The processor 200 may determine whether the replacement operation and the other operation are mergeable. The processor 200 may merge the replacement operation with the other operation based on a determination result.

In this example, the processor 200 may merge the replacement operation with the other operation by adjusting a kernel size of the other operation and a stride size of the other operation based on the number of rows or columns of the matrix.

The neural network operation apparatus 10, memory 100, processor 200, shuffler 210, pooler 230, operator 250, first memory 110, and second memory 130, in FIG. 1-14 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer.

Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RW, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network operation method, comprising:

storing a matrix on which a first neural network operation of a neural network is to be performed;

determining a replacement neural network operation in place of the first neural network operation responsive to the first neural network operation being one or both of an elementwise-sum operation and an elementwise-max operation, wherein the determining further comprises:

selecting a max-pool operation as the replacement neural operation responsive to the first neural network operation being the elementwise-max operation;

selecting an average pool operation as the replacement neural operation responsive to the first neural network operation being the elementwise-sum operation and responsive to a following operation being an average pool operation;

selecting a sum pool operation as the replacement neural operation responsive to the first neural network operation being the elementwise-sum operation and responsive to the first neural network operation not being a MAC operation; and selecting a convolution operation as the replacement operation responsive to the first neural network operation being the elementwise-sum operation and responsive to the first neural network operation being the MAC operation, and wherein the selected max-pool operation, average pool operation, or sum pool operation is determined to exclude a weight for multiplying each element by 1 so as to reduce a memory usage;

shuffling a portion of elements of the matrix, wherein the shuffling comprises shuffling either one or both of rows and columns of a first matrix included in the matrix and either one or both of rows and columns of a second matrix included in the matrix, wherein the shuffling comprises:

transmitting one row or column of the rows or columns of the first matrix to an operator as a first portion for the replacement neural network operation; and transmitting one row or column of the rows or columns of the second matrix to the operator as a second portion for the replacement neural network operation, so as to be operated adjacent to the one row or column of the first portion; and performing the replacement neural network operation for the first neural network operation based on the shuffled matrix including the first portion and the second portion to be performed in parallel in the operator, thereby enabling the operator to process two or more operations at once through merging operations to reduce a number of hardware cycles of operation, wherein the replacement neural network operation is a different operation than the first neural network operation.

2. The method of claim 1, wherein the shuffling further comprises:

storing one row or column of the rows or columns of the first matrix;

storing another row or column of the rows or columns of the first matrix at a location a predetermined interval away from a location at which the one row or column is stored; and storing one row or column of the rows or columns of the second matrix between the location at which the one row or column is stored and the location at which the other row or column is stored.

3. The method of claim 2, wherein the predetermined interval is determined based on a number of matrices on which the first neural network operation is to be performed.

4. The method of claim 1, wherein the performing comprises merging the replacement neural network operation with a subsequent neural network operation when the subsequent neural network operation is to be performed after the first neural network operation.

5. The method of claim 4, wherein the merging comprises:

determining whether the replacement neural network operation and the subsequent neural network operation are mergeable; and merging the replacement neural network operation with the subsequent neural network operation responsive to determining that the replacement neural network operation and the subsequent neural network operation are mergeable.

6. The method of claim 5, wherein the merging of the replacement neural network operation with the subsequent neural network operation further comprises:

merging the replacement neural network operation with the subsequent neural network operation by adjusting a kernel size of the subsequent neural network operation and a stride size of the subsequent neural network operation based on a number of rows or columns of the matrix.

7. A non-transitory computer-readable storage medium storing instructions that, when executed by one or more processors, configure the one or more processors to perform the method of claim 1.

8. A neural network operation apparatus, comprising:

processors configured to execute instructions; and a memory storing the instructions and configured to store a matrix on which an elementwise neural network operation of a neural network is to be performed, wherein execution of the instructions configures the processors to:

determine a replacement neural network operation in place of the elementwise neural network operation responsive to the elementwise neural network operation being one or both of an elementwise-sum operation and an elementwise-max operation, wherein the determining further comprises:

selecting a max-pool operation as the replacement neural operation responsive to a first neural network operation being the elementwise-max operation;

selecting an average pool operation as the replacement neural operation responsive to the first neural network operation being the elementwise-sum operation and responsive to a following operation being an average pool operation;

selecting a sum pool operation as the replacement operation responsive to the first neural network operation being the elementwise-sum operation and responsive to the first neural network operation not being a MAC operation; and selecting a convolution operation as the replacement neural operation responsive to the first neural network operation being the elementwise-sum operation and responsive to the first neural network operation being the MAC operation, and wherein the selected max-pool operation, average pool operation, or sum pool operation is determined to exclude a weight for multiplying each element by 1 so as to reduce a memory usage;

shuffle either one or both of rows and columns of a first matrix included in the matrix and either one or both of rows and columns of a second matrix included in the matrix, wherein the shuffle comprises:

transmitting one row or column of the rows or columns of the first matrix to an operator as a first portion for the replacement neural network operation, and transmitting one row or column of the rows or columns of the second matrix to the operator as a second portion for the replacement neural network operation, so as to be operated adjacent to the one row or column of the first portion; and perform the replacement neural network operation for the elementwise neural network operation based on the shuffled matrix including the first portion and the second portion to be performed in parallel in the operator, thereby enabling the operator to process two or more operations at once through merging operations to reduce a number of hardware cycles of operation.

9. The apparatus of claim 8, wherein the processor is further configured to:

store one row or column of the rows or columns of the first matrix, store another row or column of the rows or columns of the first matrix at a location a predetermined interval away from a location at which the one row or column is stored, and store one row or column of the rows or columns of the second matrix between the location at which the one row or column is stored and the location at which the other row or column is stored.

10. The apparatus of claim 9, wherein the predetermined interval is determined based on a number of matrices on which the elementwise operation is to be performed.

11. The apparatus of claim 8, wherein the processor is further configured to merge the replacement neural operation with a subsequent neural network operation when the subsequent neural network operation is to be performed after the elementwise neural network operation.

12. The apparatus of claim 11, wherein the processor is further configured to:

determine whether the replacement neural network operation and the subsequent neural network operation are mergeable, and merge the replacement neural network operation with the subsequent neural network operation responsive to determining that the replacement neural network operation and the subsequent neural network operation are mergeable.

13. The apparatus of claim 12, wherein the processor is further configured to merge the replacement neural network operation with the subsequent neural network operation by adjusting a kernel size of the subsequent neural network operation and a stride size of the subsequent neural network operation based on a number of rows or columns of the matrix.

14. A processor-implemented neural network operation method, the method comprising:

identifying an elementwise neural network operation on a first matrix and a second matrix on which a neural network operation is to be performed;

determining a replacement neural network operation in place of the elementwise neural network operation responsive to the elementwise neural network operation being one or both of an elementwise-sum operation and an elementwise-max operation, wherein the determining further comprises:

selecting a max-pool operation as the replacement neural operation responsive to a first neural network operation being the elementwise-max operation;

selecting an average pool operation as the replacement neural operation responsive to the first neural network operation being the elementwise-sum operation and responsive to a following operation being an average pool operation;

selecting a sum pool operation as the replacement neural operation responsive to the first neural network operation being the elementwise-sum operation and responsive to the first neural network operation not being a MAC operation; and selecting a convolution operation as the replacement neural operation responsive to the first neural network operation being the elementwise-sum operation and responsive to the first neural network operation being the MAC operation, and wherein the selected max-pool operation, average pool operation, or sum pool operation is determined to exclude a weight for multiplying each element by 1 so as to reduce a memory usage;

shuffling portions of the first matrix and the second matrix of the elementwise neural network operation, wherein the shuffling of the portions comprises:

storing respective columns of the first matrix and the second matrix in a first memory;

storing first columns from the first matrix spaced apart in the first memory by a predetermined interval; and storing respective second columns from the second matrix in the first memory between respective ones of the first columns; and performing the replacement neural network operation including the first columns and the respective second column in parallel in the operator, thereby enabling the operator to process two or more operations at once through merging operations to reduce a number of hardware cycles of operation, based on the elementwise neural network operation on the first memory, the replacement neural network operation comprising applying a kernel and a stride size to matrix data of the first memory to generate a final output matrix for the neural network.

15. The method of claim 14, wherein the predetermined interval is based on a number of matrices involved in the elementwise neural network operation including the first matrix and the second matrix.

16. The method of claim 14, wherein a size of the kernel is based on a number of columns of the first memory, and wherein a stride size for the performing of the replacement neural network operation is based on the number of columns.

* * * * *